United States Patent

[11] 3,609,507

| | | |
|---|---|---|
| [72] | Inventor | William Hamilton Beck<br>Palos Verdes Peninsula, Calif. |
| [21] | Appl. No. | 34,833 |
| [22] | Filed | May 5, 1970 |
| [45] | Patented | Sept. 28, 1971 |
| [73] | Assignee | The Garrett Corporation<br>Continuation-in-part of application Ser. No.<br>710,936, Mar. 6, 1968. |

[54] POLYPHASE INVERTER SYSTEM HAVING FAULT PROTECTION AND OUTPUT AMPLITUDE REGULATION THROUGH PULSE WIDTH MODULATION
14 Claims, 13 Drawing Figs.

[52] U.S. Cl. .......................................... 321/5,
321/9 A, 321/14, 321/19
[51] Int. Cl. .......................................... H02m 1/12,
H02m 1/18, H02m 7/52

[50] Field of Search ......................................... 321/5, 9,
14, 18, 19, 27; 318/227, 230

[56] References Cited
UNITED STATES PATENTS

| 3,324,374 | 6/1967 | Corey | 321/5 |
|---|---|---|---|
| 3,324,376 | 6/1967 | Hunt | 321/9 |
| 3,423,663 | 1/1969 | Payne | 321/5 |
| 3,445,742 | 5/1969 | Moscardi | 321/5 X |
| 3,509,440 | 4/1970 | Johnston | 318/227 |
| 3,523,236 | 8/1970 | Howell et al. | 321/9 |

Primary Examiner—William H. Beha, Jr.
Attorney—Fraser and Bogucki

ABSTRACT: A power conditioning system which by pulse width modulation of a polyphase inverter bridge provides fault protection and output amplitude regulation.

INVENTOR.
WILLIAM HAMILTON BECK
BY Fraser and Bogucki

ATTORNEYS

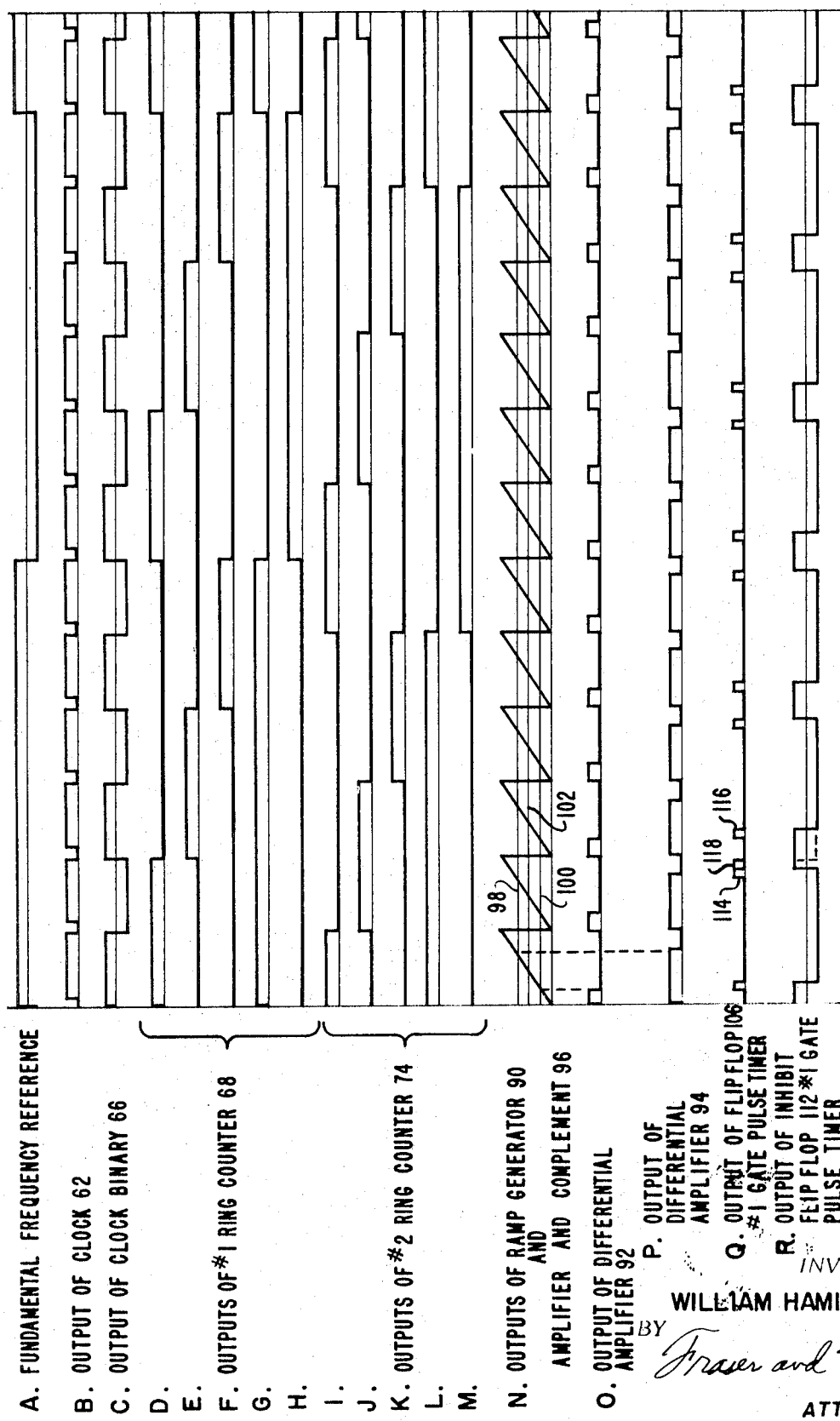

POLYPHASE INVERTER SYSTEM HAVING FAULT PROTECTION AND OUTPUT AMPLITUDE REGULATION THROUGH PULSE WIDTH MODULATION

CROSS REFERENCE TO RELATED APPLICATION

This application is a Continuation-in-Part of application Ser. No. 710,936 in the name of William H. Beck, filed Mar. 6, 1968 and entitled POLYPHASE INVERTER SYSTEM.

BACKGROUND OF THE INVENTION

The concept of pulse width modulation of direct current DC to alternating current (AC) inverters to control a single-phase output is well known. Also prior arrangements of polyphase inverters are known. However, pulse width modulation of such polyphase inverters to provide control of output voltage and current has met with very limited success among other reasons because of the problems of maintaining phase synchronization and developing proportional control of the reference signals from the inverter output. Instead attempts have been made to regulate the power from multiphase inverters by control at the input and/or output, resulting in relatively complicated and expensive arrangements which are not particularly satisfactory. When the requirements of such systems include the need to provide fault protection, additional cost and complexity are necessitated and the resulting equipment may be unduly limited in its power delivering capabilities. The difficulties encountered in providing suitable inverter systems for polyphase generation with static equipment have limited the application of such systems, particularly where high power levels with full fault protection are desired. Furthermore, where feedback regulation is employed, the response function is nonlinear (usually cosinusoidal) so that further difficulties are encountered in the control portions of such systems.

In an effort to eliminate some of the problems noted above polyphase inverter systems have been developed in which each half cycle of each of the output phases is comprised of a pair of pulses rather than a single pulse. Amplitude regulation in such systems may be accomplished by appropriate variation of a dwell angle as determined by the width of the pulses, a variation in the dwell angle being typically represented by the shifting of the time positions of the leading or trailing edges of the pulses so as to vary their width and the resulting output amplitude accordingly. Examples of polyphase inverter systems of this type are provided by U.S. Pat. 3,324,374 of Corey and U.S. Pat. 3,443,196 of Horner.

While arrangements of the type shown in the Corey and Horner patents referred to above provide certain advantages over inverter systems of the type in which each half cycle of each output phase is comprised of a single pulse, such arrangements suffer from a number of serious limitations which render them of limited use for many modern day applications and requirements. One such major problem arises in the nonsymmetrical variation of dwell angle which results from the variations in the time positions of only the leading or trailing edges of the output pulses and not both. Consequently it is necessary to operate the inverter system in a normal mode at a fixed dwell angle for optimum harmonic reduction with selective switching into a fault mode of operation only when substantial overload conditions exist and harmonic reduction becomes a secondary consideration. Output amplitude regulation, moreover, is itself achieved at the expense of an increase in harmonics which results from dwell angle variation.

Another significant disadvantage of inverter systems of the type described above lies in the phase shifting of the output fundamental waveforms which results from dwell angle variation. Such resulting phase shift makes it difficult if not impossible to parallel such inverter systems with existing systems of fixed output phase.

Further disadvantages of inverter systems of the type described above derive from the inherent nature of the types of circuitry frequently employed to gate the inverter switching elements. The gating circuitry employed in the arrangements of the Corey patent referred to above, for example, employs one common technique utilizing master and slave oscillators and phase shifters. Such components afford little system stability and are highly susceptable to drift and variations due to such factors as temperature changes and aging. Accordingly if one or more key components such as a phase shifter drifts from its desired value such as 90° to another value such as 85°, such component as well as the remaining components having an operation which depends therefrom are similarly affected in their accuracy. Such gating arrangements, moreover, are typically fixed in fundamental frequency so that they cannot be operated in conjunction with an external fundamental frequency reference signal, cannot easily accommodate the addition of inverter bridges where further harmonic reduction is desired or required, do not provide inverter legs which operate at the same power factor so as to facilitate system design and use, and employ an excessive amount of circuitry or componentry to achieve a given harmonic reduction requirement.

As previously pointed out inverter systems of the type described thus far must normally be operated at a fixed dwell angle so as to maintain harmonics at a minimum with the practical result that amplitude regulation of any consequence is rendered impossible during such normal operating modes. When a fault condition of sufficient consequence arises, such systems may then typically enter a fault mode of operation in which the dwell angle is varied in an attempt to provide the necessary compensation. If the fault condition is not too severe the circuitry may be capable of responding quickly enough to provide complete compensation for the fault condition and restore the system operating conditions. However, where a relatively severe fault condition arises as may be defined by a short circuit with resulting very rapid increase in the output current, such systems typically cannot respond rapidly enough to provide adequate compensation, particularly where relatively high levels of power are involved.

It is therefore a general object of the invention to provide improved polyphase inverter systems for AC power generation.

It is a more particular object of the present invention to provide a polyphase inverter system capable of regulation of output power by means of symmetrical pulse width modulation within the inverter.

It is a further object of the present invention to provide a polyphase inverter system employing digital gating logic techniques.

It is a still further object of the present invention to provide an improved polyphase inverter system capable of providing substantially instantaneous response to a bolted fault condition.

A still further object of the present invention is to provide a polyphase inverter system in which the fundamental frequency may be regulated from an external source.

Another object of the present invention is to provide a polyphase inverter system capable of operating in a fault mode without harmonic increase and which minimizes the circuitry required for a given output harmonic reduction.

Another object of the present invention is to provide a polyphase inverter system which may be readily paralleled with other power systems, which may readily be provided with additional inverter bridges where further harmonic reduction is desired, and which maintains a substantially constant power factor at each of the inverter legs thereof.

SUMMARY OF THE INVENTION

In brief, the invention contemplates a novel power conditioning system (inverter) for converting direct current to polyphase alternating current. Arrangements in accordance with the invention provide regulation of output voltage and detection of and instantaneous protection from fault conditions (excessive current) at the output, automatically cutting off faulted output circuits until the fault is removed. Such results are made possible by controlling the time duration of application of power to the respective individual output phases in each AC cycle through the selective application of control signals at a rate which is higher than the intended output frequency of the inverter. This produces output line-to-line pulses at a higher frequency but in such a sequence as to develop, upon filtering, the desired fundamental of polyphase AC. The invention utilizes pulse width modulation in a manner which divides single output pulses into two or more, thus maintaining the same fundamental output frequency from the output filters.

Arrangements according to the invention employ digital gating logic circuitry to gate one or more inverter bridges in a fashion such that the output pulse widths are symmetrically modulated and without any resulting phase shift in the output fundamental waveforms. The gating circuitry associated with each inverter bridge responds to common clocking in digital logical fashion, and the fundamental output frequency may be varied in accordance with an external fundamental frequency reference as applied to appropriately vary the common clocking. By maintaining the output fundamental waveforms fixed in phase as variation of the dwell angle by modulation of the width of the pulses thereof occurs, the inverter system may be normally operated in a fault mode to provide constant amplitude regulation without attendant harmonic increase. The gating circuitry and number of inverter bridges required to achieve a given harmonic reduction, moreover, is significantly less than the comparable circuitry required by typical prior art inverter systems. The fixed phase of the output fundamental waveforms of such inverter systems together with the inherent capability of constant output amplitude regulation facilitate the coupling of such inverter systems in parallel with existing power systems of fixed frequency and phase. The power factor of each inverter leg remains substantially constant enabling the analysis of a single inverter leg and the application of design criteria resulting therefrom to all inverter legs of the system. In the event of a severe fault condition normal dwell angle control circuitry is bypassed so as to provide a substantially instantaneous change in output signal conditions until such time as normal control can be safely restored.

In one arrangement of an inverter system according to the invention two different inverter bridges, each comprising three inverter legs, are gated by separate sets of digital logic circuitry responsive to common master clock circuitry. An error circuit compares the actual fundamental frequency fed back from the gating logic circuitry with a fundamental frequency reference signal to drive a master clock at twelve times the desired fundamental frequency. The output frequency of the master clock is halved by a clock binary circuit prior to being applied to a different ring counter and gate pulse timer associated with each of the inverter bridges. Each ring counter provides to an associated gate matrix signals occurring every 60° during each cycle of the output fundamental together with a signal of frequency equal to that of the output fundamental for feedback to the error circuit as desired. Each gate pulse timer responds to the halved clock signal from the clock binary circuit as well as to the output of a dwell control circuit to provide a pair of gating pulses each 60° of the output fundamental together with a varying signal as derived from an inhibit flip-flop therein.

Each gate matrix responds to the associated ring counter and gate pulse timer to selectively apply the received gating pulses to different ones of gate drivers associated with the different inverter legs of the associated inverter bridge. The gate drivers include drive flip-flops which respond to the applied gating pulses to control the alternate conduction of the pair of switching elements or thyristors in the associated inverter legs.

The dwell control circuit which is common to and determines the time positions of the pairs of gating pulses derived by the gate pulse timers includes circuitry for generating a ramp voltage at the frequency of the master clock. A second circuit associated with the dwell control circuit provides the true and complementary values of the amplitude error voltage to a pair of differential amplifiers within the dwell control circuit, the differential amplifiers in turn being operative to provide a signal indication to the gate pulse timers each time the value of the ramp voltage coincides with one of the true and complementary input voltages to define the time positions of the resulting gating pulses as generated by the gate pulse timers. Accordingly the time distance between each pair of gating pulses varies linearly according to the magnitude of the amplitude error voltage and its complement to provide linear variation of the dwell angle with the amplitude error voltage.

The amplitude error voltage is provided by circuitry which constantly monitors the inverter output current and voltage. Such circuitry converts the output current into a corresponding voltage, with the larger of the two voltages as derived from the inverter output being compared to a reference potential and thereby providing the amplitude error voltage to the dwell control circuit.

In the event a dangerously large overcurrent condition arises, an overcurrent detector responds to bypass the normal dwell angle control circuitry by initiating the generation of a gating pulse immediately after the generation of the first gating pulse of each pair by the gate pulse timers. This action provides substantially instantaneous compensation of the overcurrent condition at the inverter output. As soon as the overcurrent condition is restored to a safe level, the inverter output amplitude is again regulated using the normal dwell angle variation provided by the amplitude error circuit and associated dwell control circuit.

BRIEF DESCRIPTION OF THE DRAWINGS

A better understanding of the present invention may be had from a consideration of the following detailed description, taken in consideration with the accompanying drawings, in which.

DETAILED DESCRIPTION OF THE INVENTION

Figure 1:
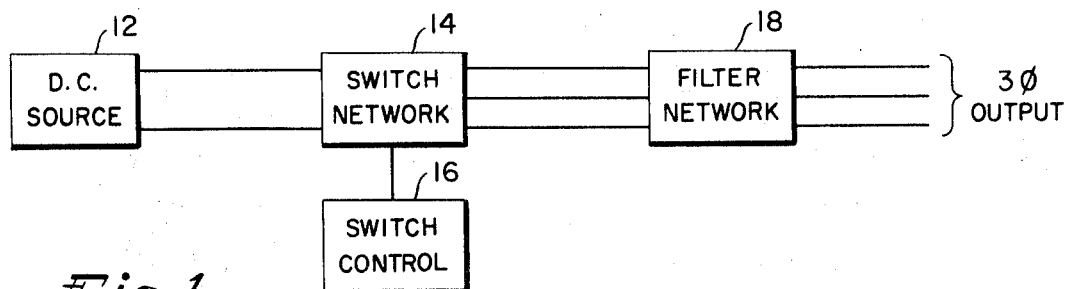
FIG. 1 is a block diagram of a prior art inverter system.

In FIG. 1 a conventional DC-to-AC, 3Φ inverter system of the prior art is shown as comprising a DC source 12, a switch network 14, a switch control stage 16 and, as an addition to the output at the inverter proper, a filter network 18.

Figure 2:
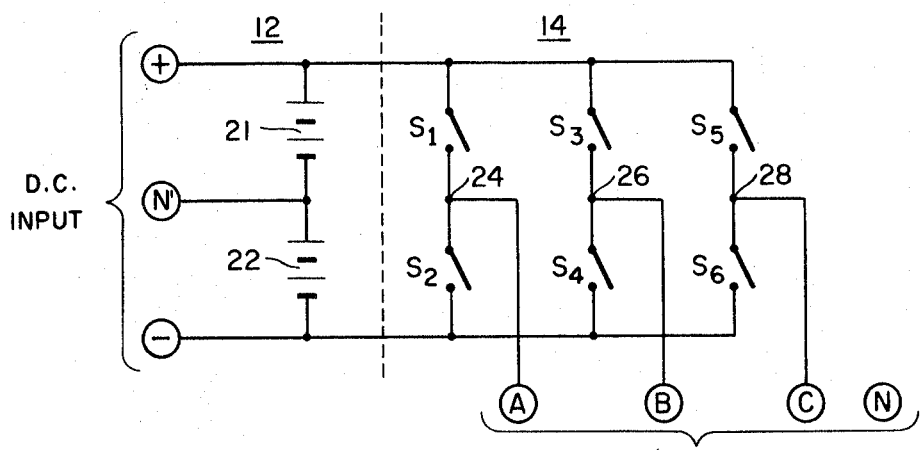
FIG. 2 is a simplified schematic diagram of a portion of the arrangement of FIG. 1 and also represents corresponding portions of arrangements in accordance with the present invention.

FIG. 2 is a simplified schematic representation of the DC source 12 and the switch network or inverter bridge 14 of FIG. 1 and is included for purposes of explanation of the manner in which DC is converted to 3Φ AC. The DC source 12 is shown as comprising a pair of batteries 21 and 22 connected in series across a pair of DC input terminals. In the switch network 14 two groups of switches, $S_1$, $S_2$, $S_3$ and $S_4$, $S_5$, $S_6$ (which may preferably be silicon controlled rectifier switching devices), are arranged in a basic 3Φ version of an inverter bridge. It will be noted that the switches are arranged in three legs for the 3Φ inversion, each leg containing a pair of switches constituting an odd numbered switch and an even numbered switch ($S_1$ and $S_2$, for example), in series across the two oppositely poled terminals of the DC source 12. Connected to a node between each pair of switches is a corresponding output phase terminal. Thus, the A phase of the output is connected to a node 24 between the switches $S_1$ and $S_2$, the B output phase is connected to a node 26 between the switches $S_3$ and $S_4$, and the C output phase is connected to a node 28 between the switches $S_5$ and $S_6$. In addition, a neutral designated N at the 3Φ output is shown and this may be grounded or floating as desired. It may be connected to the neutral point marked N′ between the batteries 21 and 22 of the DC source 12 if desired, but this is not essential. It will be understood that the respective switches $S_1$-$S_6$ are controlled by signals from the switch control stage 16.

In the conventional operation of a polyphase inverter corresponding to FIGS. 1 and 2, it should be kept in mind that the switches in a given vertical leg of the switch network 14 are always operated in opposition to each other. That is, when one of the pair of switches is closed the other is opened, and vice versa. As for example, when $S_1$ is closed, $S_2$ is open and when $S_1$ is opened, $S_2$ is closed. The same is true with respect to the pairs $S_3$-$S_4$ and $S_5$-$S_6$.

Figure 3:
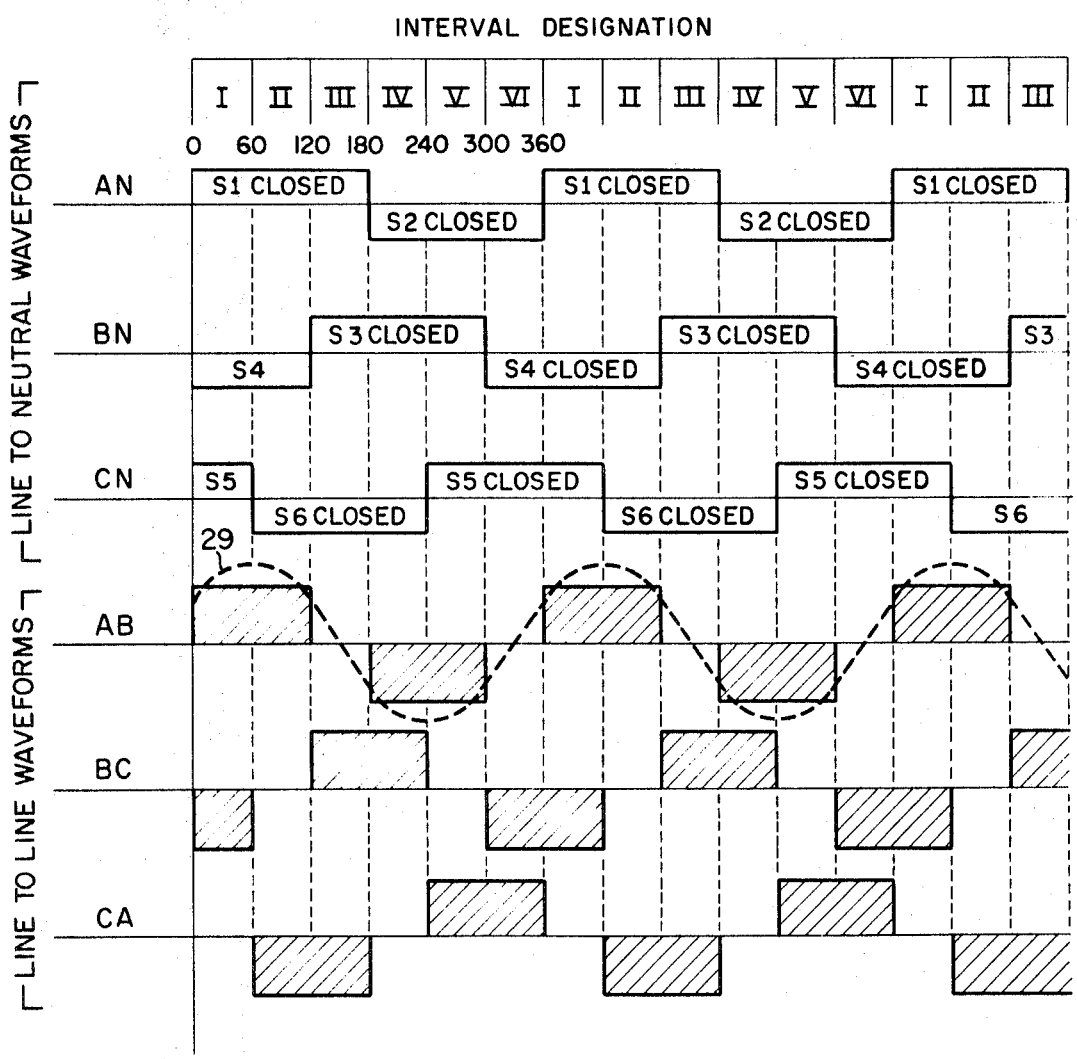
FIG. 3 is a waveform diagram corresponding to the conventional operation of the arrangement of FIG. 1.

In the operation of the inverter as shown thus far, a particular switching sequence of the switch network 14 is employed to develop output waveforms corresponding to those shown in FIG. 3. In this figure, the waveforms shown along the upper three horizontal lines designated AN, BN and CN, represent respectively the voltage between line and neutral for the three output phases. [It should be noted that these waveforms correspond to the outputs A, B and C as represented in FIG. 2 and before they are directed to the filter network 18 of FIG. 1.] The waveforms depicted along the lower three horizontal lines designated AB, BC and CA represent respectively the line-to-line voltages between the output phases. The diagram of FIG. 3 has been divided horizontally at the top of the diagram into periods corresponding to repetitive cycles of the fundamental of the output frequency, with each period being further divided into six equal segments designated I-VI each corresponding to 60 electrical degrees of the fundamental.

When a particular one of the switches $S_1$-$S_6$ is closed, the potential on the output phase leg connected to that switch is either positive or negative depending upon which of the DC terminals the individual switch is connected to. Thus, the potential of the A phase leg to neutral is shown to be positive when the switch $S_1$ is closed and negative when the switch $S_2$ is closed. The condition of the switches controlling a particular phase leg is changed every 180° of the output fundamental frequency, with the switching in the various legs being controlled to develop a 60° phase shift between the output phase legs as is conventional for normal 3Φ operation.

The waveforms representing the line-to-line voltages in the lower portion of FIG. 3 are each derived from a combination of the corresponding pair of the line-to-neutral waveforms with appropriate observance of polarity. These waveforms are therefore double the amplitude of the line-to-neutral waveforms (except when they are zero) and alternate from positive to negative in the form of pulses which extend for two periods or 120 electrical degrees. Just as in any polyphase system, the phase of the line-to-line voltage is shifted relative to the phase of the line-to-neutral voltage. The zero portion of the line-to-line waveform at the output of the switching network (FIGS. 1 and 2) results when both output legs are connected to the same side of the DC source through appropriate switches of the switch network 14. These periods extend for 60 electrical degrees and their midpoints correspond to the zero crossings of the fundamental output waveform after proper filtering in the filter network 18. One sinusoidal waveform 29 has been shown in broken line representation corresponding to the filtered output of the line-to-line voltage between the A and B output legs.

Previous attempts to provide for voltage regulation of such a system by means of pulse width modulation have been directed at either delaying the start or advancing the termination of an individual output pulse. However, this is difficult to achieve because it involves a phase shift of the master clock pulses in a manner which is nonuniform and it also presents a distortion of the 3Φ sinusoidal waveform which is to be developed at the output of the filtered network. Accordingly, such attempts have not met with success.

Figure 4:
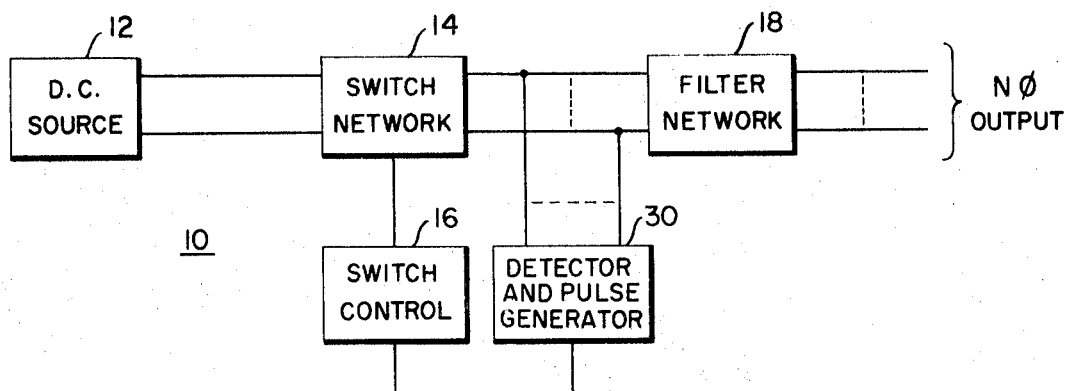
FIG. 4 is a block diagram of one particular arrangement of a polyphase inverter in accordance with the present invention.

A general representation of one arrangement in accordance with the invention is shown in block diagram form in FIG. 4 wherein the DC source 12, the switch network or inverter bridge 14, the switch control stage 16 and the filter network 18 as before are included in combination with a detector and pulse generator stage 30 to provide a polyphase inverter 10 in which any desired number of phases may be employed, as indicated by the designation "nΦ" at the output. Although the detector and pulse generator stage 30 is shown coupled to the inverter output ahead of the filter network 18, it may as well be coupled to the output after passage through the filter network 18; and, as already discussed, it is generally preferable to detect current levels ahead of the filter and voltage levels after filtering has occurred.

Figure 5:
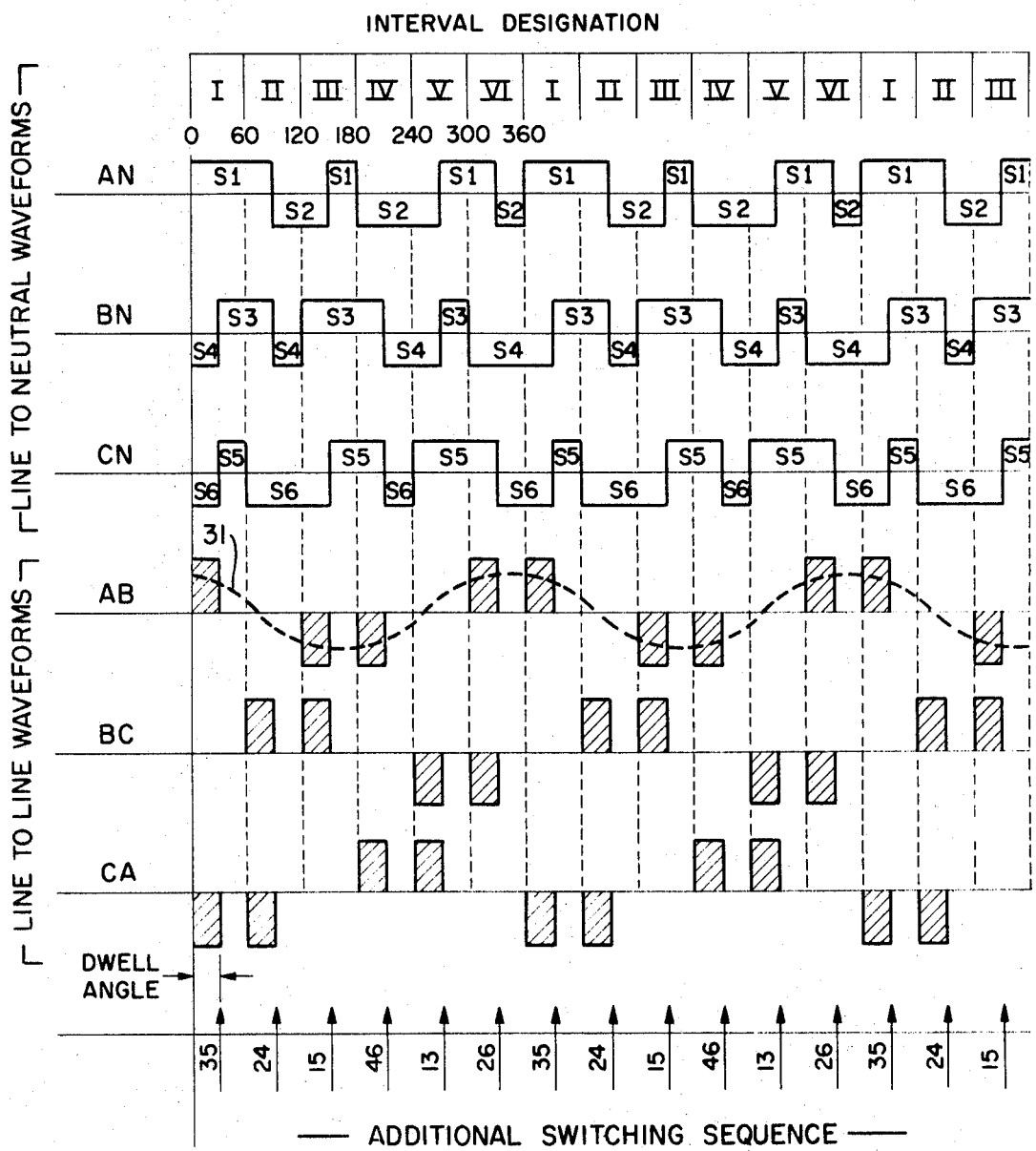
FIG. 5 is a waveform diagram corresponding to the operation of the arrangement of FIG. 4.

The operation of the inverter system 10 may be better understood by reference to FIG. 5 which is a waveform diagram corresponding to that shown in FIG. 3 for the operation of the inverter previously described. As in FIG. 3, FIG. 5 depicts the line-to-neutral waveforms in the upper portion of the diagram and the line-to-line waveforms in the lower portion of the diagram, both prior to filtering. The fundamental frequency is the same as in FIG. 3 and each period represented is divided into six segments of 60 electrical degrees each. However, an additional switching sequence is provided by means of the detector and pulse generator 30 as indicated at the very bottom of FIG. 5. As shown in FIG. 5, this additional switching sequence provides switching pulses halfway between the switching pulses occurring at the 60° intervals provided by the master clock, and the delay from such a pulse relative to a master clock pulse is referred to as the dwell angle. In the case illustrated, the dwell angle is equal to 30 electrical degrees of the period of the fundamental frequency. It should be kept in mind however that the dwell angle can be varied from virtually zero to virtually 60° (for a 3Φ system) in order to provide a range of output amplitude from near zero to the full amplitude which is developed in the mode depicted in FIG. 3, and the phase relationship shown in FIG. 5 is merely illustrative of the concept.

For ease of understanding the diagram of FIG. 5 is illustrated in the context of a 3Φ inverter system. However, it should be understood that it is applicable to a polyphase system of any number desired. Additional phases may be developed simply by the use of additional legs in the switching network 14 as shown in FIG. 2 as later described, each leg being understood to contain another pair of switches which operate in opposition to each other in the manner described.

In the operation of arrangements as represented in FIG. 5, the master clock changes the condition of a selected switch pair at each 60° point, just as it did in the operation of the inverter system of FIG. 1, represented in FIG. 3. Thereafter, and before the end of the 60° interval at which another master clock pulse occurs, a pulse of the secondary or additional switching sequence is applied to switch those switches which were not changed in condition by the master clock pulse last occurring. Thus, as shown in FIG. 5, $S_1$ is switched on by master clock pulses at the zero and 360° points. Thereafter, a pulse from the secondary or additional switching sequence is applied to the switches in those legs which were not last switched by the master clock pulse (namely those connected to the B and C output phases) to change the states of the switches therein. In the example shown, this additional control pulse turns on the switches $S_3$ and $S_5$, and it therefore bears the designation 35. Turning on switches $S_3$ and $S_5$ with $S_1$ on connects all three phases directly to the same side of the DC source so that the output line-to-line voltage is zero for all phases. Thereafter at the 60° point, the master clock pulse is applied to change the state of the C phase leg, thus turning on switch $S_6$. However, the two switches controlling the A and B phase legs are still in a condition to connect these legs to the same side of the DC source so that the line-to-line output between legs A and B remains zero. At 90° an additional pulse designated 24 is applied to change the state of the switches $S_2$ and $S_4$, but because both of them change together to switch legs A and B from the positive DC terminal to the negative DC terminal, there is no change in the potential between points A and B so that the line-to-line voltage between these phase legs remains at zero. Thereafter at 120°, a master clock pulse changes the $S_3$–$S_4$ switch condition without affecting the switches $S_1$ and $S_2$, resulting in a negative output between lines A and B. At 150° an additional pulse designated 15 is applied which turns on $S_1$, thus connecting line A to the same side of the DC source as line B so that again the line-to-line output is zero. At 180° the master clock pulse turns on $S_2$ without affecting $S_3$ so that again a negative output pulse is developed between lines A and B. Thirty degrees later an additional pulse designated 46 is applied which causes switch $S_4$ to connect the B phase line to the same side of the DC source as the A phase line and again the A-B line-to-line voltage is zero.

The sequence of a master clock pulse which switches one pair of switches, followed by an additional control pulse applied to change the condition of both pairs of switches which were not affected by the last master control pulse, followed by another master control pulse to change the condition of another single pair of switches, etc. continues repetitively to develop the desired output. It will thus be noted that the switching in this fashion produces a frequency of switching for each of the individual line-to-neutral waveforms which is three times the switching frequency encountered in an inverter without the provision of the additional switching sequence. The output line-to-line, however, is a series of pairs of like-polarity pulses, each having a duration equal to the selected dwell angle. Each pair of like-polarity pulses at the line-to-line output corresponds to a single pulse of the line-to-line waveforms of FIG. 3. Thus it will be seen that the fundamental frequency developed by the line-to-line waveforms of FIG. 5 is the same as before. However, because the integral of the pulses of a like-polarity line-to-line pair in FIG. 5 is less than the corresponding single pulse line-to-line of FIG. 3, the amplitude of the fundamental waveform after filtering, represented by the dashed line 31 of FIG. 5, is less than the waveform 29 of FIG. 3. In fact, the amplitude of the fundamental waveform developed in the manner represented in FIG. 5 varies linearly within the range of the dwell angle from zero to 60° as a proportion of the maximum fundamental amplitude shown in FIG. 3. Such a maximum amplitude would be reached when the dwell angle is 60° or, in effect, no additional switching pulses are applied.

Figure 6:
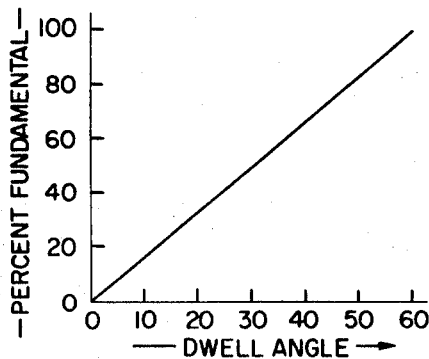
FIG. 6 is a graph representing the relationship between amplitude of the fundamental output waveform and dwell angle developed from the operation of arrangements in accordance with the invention.

The relationship of percentage of the fundamental amplitude as a function of the dwell angle in degrees of the fundamental frequency period is represented as a plot in FIG. 6 and it may be observed that the relationship as depicted is essentially a straight line, thus indicating that the amplitude is a linear function of dwell angle. This advantageously simplifies the provision of voltage regulation of a polyphase inverter system because control of the dwell angle, which in turn controls output magnitude, can be developed by means of linear elements from a detector which is responsive to the actual output line-to-line voltage and/or current, as is provided in the present invention.

It should be further pointed out that the principles of the present invention advantageously permit ready control of the polyphase inverter systems in accordance with the invention for immediate response to a fault condition across the output. Detection of a fault, indicated by some current level in excess of a rated maximum, can be utilized to shift the dwell angle to near zero, so that the output is at or near zero. Actually in the case of a fault condition it is desirable to have some nonzero current output so that the slower-acting circuit breaker equipment can respond to the presence of the fault by cutting off the particular circuit which is involved. Thereafter, once the fault condition is cleared by the action of a circuit breaker or fuse in disconnecting the affected circuit, the inverter detects the clearing of the fault and immediately restores full output.

Figure 7:
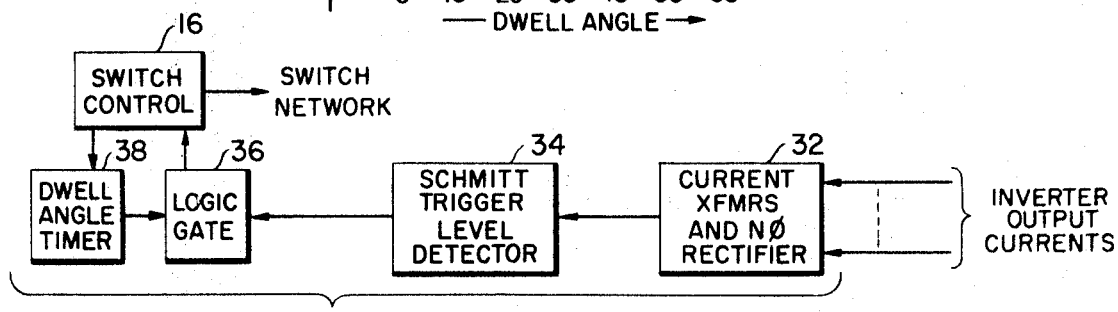
FIG. 7 is a block diagram showing further details of the system of FIG. 4 in accordance with one particular embodiment of the invention.

One particular arrangement for providing fault protection for a polyphase inverter system in accordance with the invention is shown in further detail in block diagram form in FIG. 7, which represents a portion of the arrangement of FIG. 4. In this particular embodiment, the circuit is intended to provide fault protection only, without the additional feature of voltage regulation. In the arrangement of FIG. 7, which corresponds to the switch control 16 and the detector and pulse generator 30 of the system of FIG. 4, the detector and pulse generator 30 is shown comprising a current transformer and rectifier stage 32 responsive to the output currents from the inverter 10, a Schmitt trigger level detector 34, a logic gate 36 and a dwell angle timer 38. The stages 32 and 34 provide the detection, while the dwell angle timer 38 serves as a delay pulse generator with the logic gate 36 being responsive to signals from the level detector 34 to control the application of additional switching pulses to the switch control stage 36 for final application to the appropriate switches of the switch network.

Figure 8:
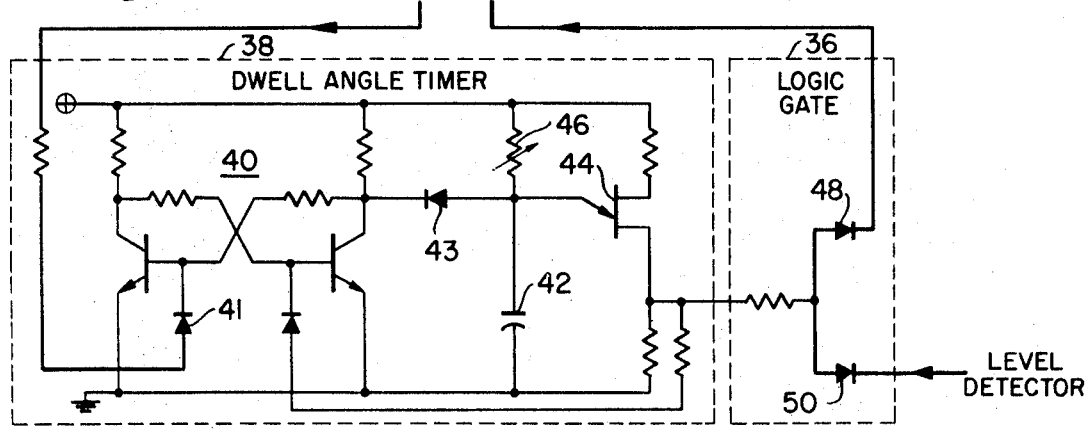
FIG. 8 is a circuit diagram of a portion of the arrangement shown in FIG. 7.

Typical circuitry which may be employed in the dwell angle timer 38 and the logic gate 36 is shown in schematic diagram form in FIG. 8. As shown in FIG. 8, the dwell angle timer 38 comprises a flip-flop 40 and a charging capacitor 42 controlling a unijunction transistor 44 for the generation of an output pulse which constitutes the additional switching pulse. Operation of the dwell angle timer is initiated by a master pulse from the switch control stage 16 applied via diode 41 which switches the flip-flop 40 by turning on the left-hand transistor and turning off the right-hand transistor. This blocks the coupling diode 43, thus permitting the capacitor 42 to begin charging toward positive potential through the element represented as a variable resistor 46. When the potential across the capacitor 42 reaches the triggering level of the unijunction transistor 44, the latter turns on, generating a pulse for application to the switch control stage 16 via the diode 48 (if passed by the logic gate 36), which pulse also resets the flip-flop 40.

The level detector 34 of FIG. 7 controls the logic gate 36 via the diode 50 (FIG. 8). In normal operation of the inverter, the level detector 34 is arranged to maintain the diode 50 forward biased and provide a bypass path for pulses from the dwell angle timer 38, thus preventing such pulses from being applied to the switch control stage 16 via the diode 48. However, when the signal fed back from the inverter output via the current transformer and rectifier stage 32 exceeds a predetermined threshold level of the Schmitt trigger level detector 34, the bias condition applied to the diode 50 is changed so that the diode 50 is now maintained back-biased and pulses from the dwell angle timer 38 are thereafter directed through the diode 48 to develop the additional switching sequence at the switch control stage 16 as previously described. The timing of these additional switching pulses relative to the master clock pulses is determined by an adjustment of the variable potentiometer 46 in the dwell angle timer 38 and, in this particular arrangement of the invention, is normally set to provide a low amplitude of output which will develop sufficient current in the faulted circuit to trip the circuit breaker and cut that circuit off. In the fault condition, the impedance of the filter network 18 is sufficient to limit the current to the desired value with the inverter operating in the fault mode as controlled by the circuitry shown in FIG. 7.

Figure 9:
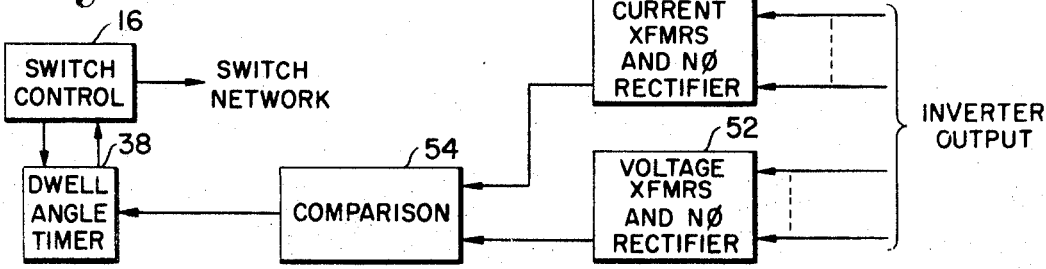
FIG. 9 is a block diagram representing in greater detail a portion of the arrangement of FIG. 4 in accordance with another particular arrangement of the invention.

FIG. 9 shows the portion of the system depicted in FIG. 4 corresponding to FIG. 7, but in an alternative arrangement representing another embodiment of the invention. This arrangement provides both fault protection and automatic regulation of the output voltage at a predetermined level. It will be noted that the portion of the system depicted in the diagram of FIG. 9 includes a dwell angle timer 38, a current transformer and rectifier stage 32, a switch control stage 16, as in FIG. 7 plus a voltage transformer and polyphase rectifier stage 52 and a comparison stage 54 connected as shown.

Specific connection to the inverter output is not shown but this may be made in line with considerations already discussed. The current transformer and rectifier stage 32 and the voltage transformer and rectifier stage 52 are effectively in parallel with each other as to their output connections, the latter of which are directed to the same point in the comparison stage 54. In general the stage 32 receives its input from the inverter output before filtering while the stage 52 receives an input from the filtered output of the inverter. The comparison stage 54 may be considered to comprise a conventional difference amplifier in which a zener diode or equivalent element may be employed to provide a reference level against which the inputs from the stages 32 and 52 are to be compared. The output of the comparison stage 54 is applied to control a transistor or equivalent variable impedance charging path in place of the potentiometer 46 shown in the dwell angle timer circuit 38 of FIG. 8. The control of the variable impedance element is such that as the signal from the comparison stage 54 increases, the impedance of the charging path for the capacitor 42 in FIG. 8 is reduced with a corresponding reduction in the dwell angle and a resulting tendency to reduce the level of the output voltage developed by the polyphase inverter. Similarly, as the level of the signal from the comparison stage 54 decreases, the impedance of the charging path for the capacitor 42 is increased, increasing the dwell angle and tending to increase the level of the output voltage of the polyphase inverter.

Either of the two stages 32, 52 may control the comparison stage 54, with the larger of the two input signals to the comparison stage 54 capturing the stage to provide the input signals for comparison with the reference level therein. Thus, as the output voltage rises above the predetermined desired level, generally corresponding to a lower current level, the voltage signal from the stage 52 will be effective in controlling the operation of the comparison stage 54 and the dwell angle developed by the dwell angle timer 38. Conversely, as the output current rises, generally corresponding to a reduction of output voltage as excessive load is applied to the system, the signal from the current detection stage 32 will eventually exceed the signal from the voltage detector stage 52 and thereafter control the comparison stage 54 and thereby the dwell angle of the dwell angle timer 38 within the limits of regulation capability of the system. Should the output current continue to rise to an overload condition, the current feedback signal from the stage 32 overrides the voltage feedback signal from the stage 52 and controls the input to the comparison stage 54 so that as a result of the high output current, the dwell angle developed in the timer stage 38 is reduced. This will advantageously limit the current produced by the inverter system of the invention to a safe level for the equipment included in the system. In this particular arrangement, should a fault condition be suddenly encountered, the response of the system is virtually instantaneous, just as was the case in the arrangement represented in FIG. 7, so that the dwell angle is immediately reduced to a point near zero which results in an output current within limits of safety but adequate to cause the circuitbreaker in the faulted circuit to trip and cut off the affected circuit. Thereafter normal regulated output is restored just as soon as the faulted circuit is cut off.

The invention advantageously provides for complete isolation of the DC source from the load, if desired, while at the same time the load phases are tied together. This enables the system to handle sudden transients, particularly with reactive loads, without special protection. Thus, if desired, the switching sequence can be carried on without interruption but with zero output from the inverter if the dwell angle is zero. This ties the output phase legs together and simply shifts them from one side of the DC source to the other.

It should be understood that the concepts and principles of the present invention are generally applicable to polyphase inverter systems without limitation to the number of phases involved nor to the multiple of the switching network which is introduced by the addition of the secondary switching sequence. For example, although a three-times multiple of the switching frequency is shown in FIG. 5 for the 3Φ system on which the description of FIG. 5 is based, it should be understood that the switching frequency can be a six-times or nine-times or higher multiple of the switching frequency shown in FIG. 3 as described in detail hereafter. Other additional switching sequences may also be employed within the principles of the invention. For example, the additional switching sequence shown in FIG. 5 may be described as follows:

interval I assure 3 and 5 close with additional sequence (4 & 6 open)

interval II assure 2 and 4 close with additional sequence (1 & 3 open)

interval III assure 1 and 5 close with additional sequence (2 & 6 open)

interval IV assure 4 and 6 close with additional sequence (3 & 5 open)

interval V assure 1 and 3 close with additional sequence (2 & 4 open)

interval VI assure 2 and 6 close with additional sequence (1 & 5 open)

Similar results in a polyphase inverter in accordance with the invention can be achieved by the use of another additional switching sequence as follows in place of that set forth immediately above:

interval I assure 3 closes with additional sequence (4 opens)

interval II assure 2 closes with additional sequence (1 opens)

interval III assure 5 closes with additional sequence (6 opens)

interval IV assure 4 closes with additional sequence (3 opens)

interval V assure 1 closes with additional sequence (2 opens)

interval VI assure 6 closes with additional sequence (5 opens)

Figure 10:
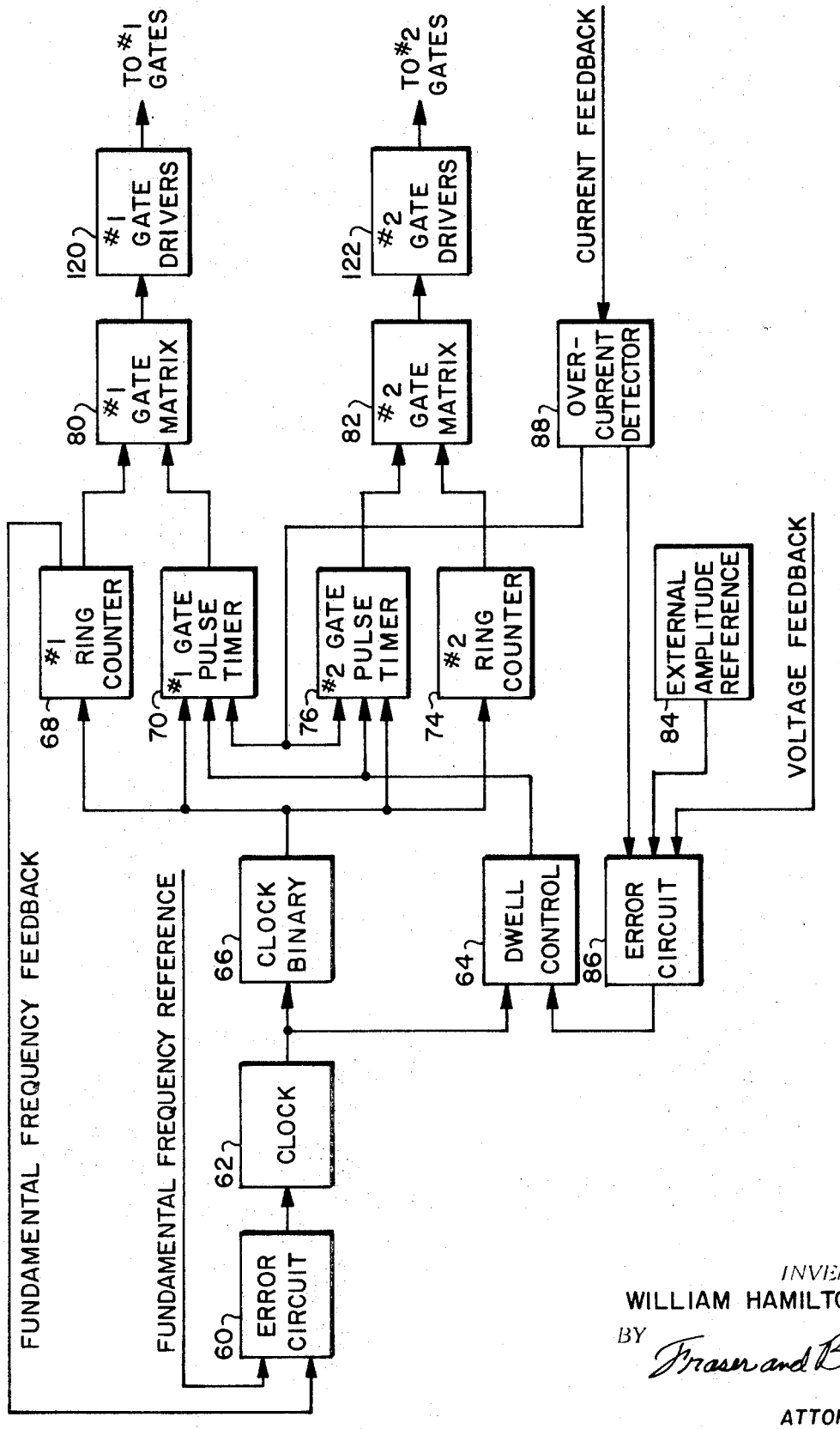
FIG. 10 is a block diagram of a further particular arrangement of a polyphase inverter in accordance with the invention in which digital gating logic circuitry is employed in conjunction with a pair of inverter bridges or switching networks to provide a three phase output.

FIG. 10 illustrates a further arrangement of an inverter system according to the invention. In the particular arrangement so illustrated digital logic gating circuitry is employed to gate a pair of bridge networks shown in detail in FIG. 13 and corresponding to the switch network 14 of the FIG. 1 arrangement.

Figure 11:
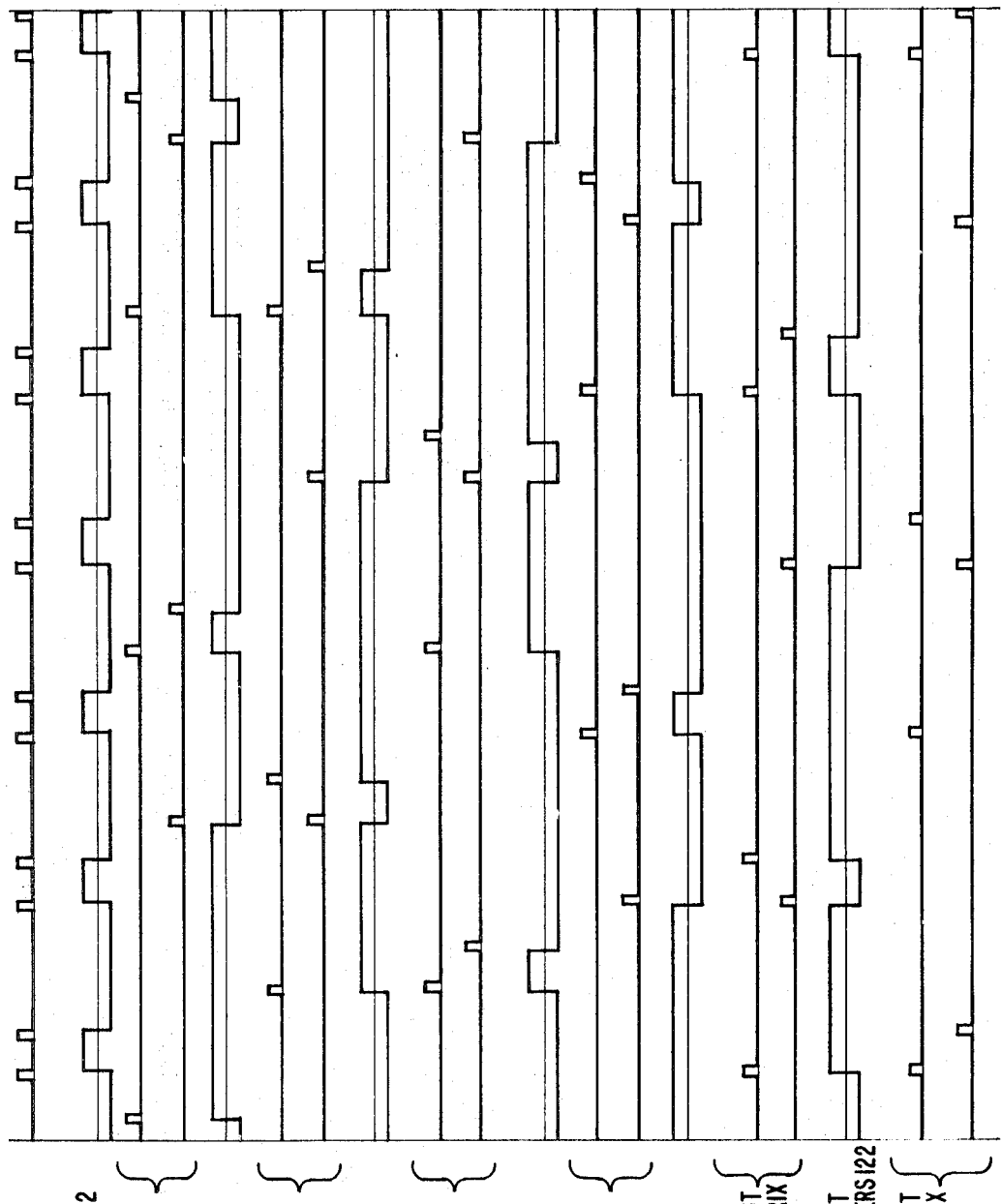
FIG. 11 is a waveform diagram corresponding to the operation of the arrangement of FIG. 10.
Figure 11:
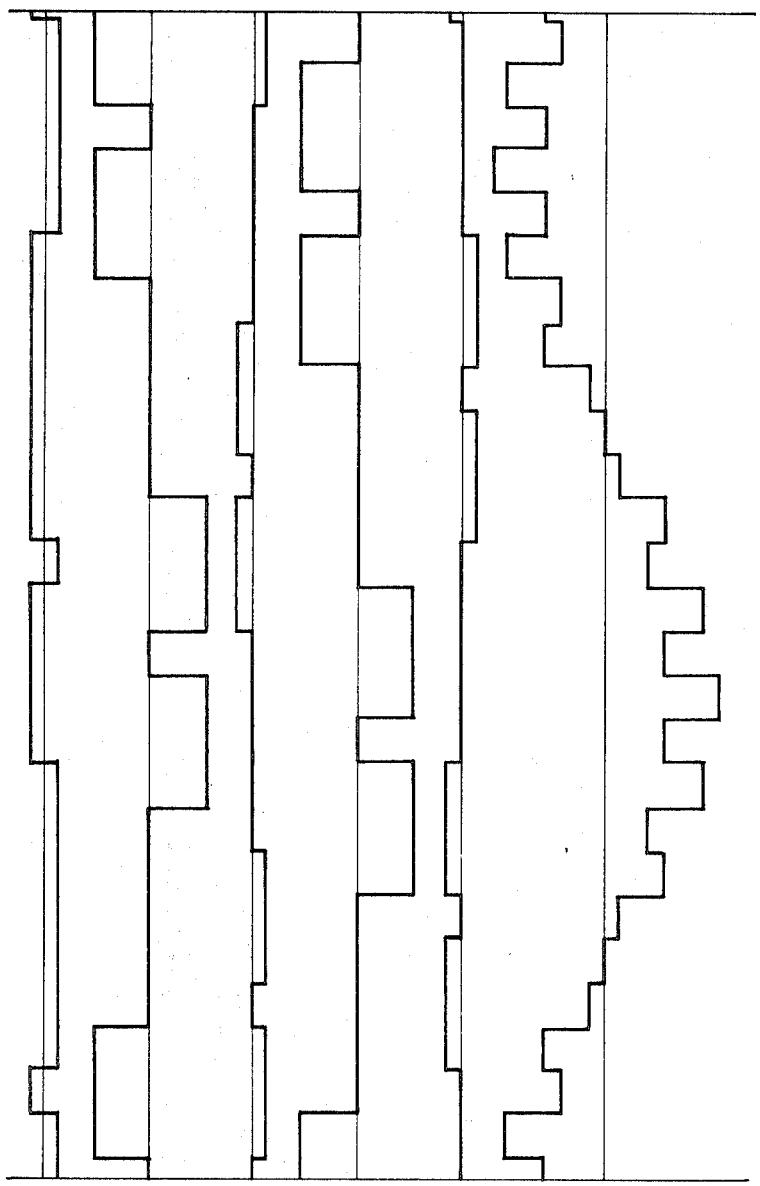

Referring to FIG. 10 an error circuit 60 is coupled to receive both a fundamental frequency reference signal from an external source and a fundamental frequency feedback signal from the output portion of the circuitry. The fundamental frequency reference signal which is illustrated in FIG. 11A and which is conveniently assumed to have a frequency of 60 Hz. for convenience of subsequent discussion comprises an external reference determining the fundamental frequency at which the inverter system is to operate. The error circuit 60 which may comprise a demodulator or other appropriate circuitry for comparing the actual or feedback signal with the reference signal provides to a master clock 62 a signal representing the desired fundamental frequency and phase of operation. This signal is selectively increased or decreased in accordance with any differences which may exist between the frequencies and/or phases of the two input signals thereto.

The clock 62 which may comprise a voltage controlled oscillator responds to the input signal from the error circuit 60 to provide a clock signal as shown in FIG. 11B which is twelve times the fundamental frequency (in the present example 720 Hz.) A frequency twelve times that of the fundamental is used as the overall clock for the system in that six separate inverter legs are employed and gating or firing takes place essentially every 30 electrical degrees of the fundamental.

The clock signal at the output of the master clock 62 is applied to a dwell control 64 and to a clock binary 66. The clock binary 66 divides the frequency of the master clock by a factor of 2 to provide an output signal having a frequency which is six times that of the fundamental or 360 Hz. as shown in FIG. 11C. The clock binary 66 may comprise a flip-flop or other appropriate circuitry for accomplishing this function. The output signal from the clock binary is applied to a 01 ring counter 68 and to a 01 gate pulse timer 70 associated with the 01 gates comprising a first inverter bridge 72 shown in detail in FIG. 13, as well as to a 02 ring counter 74 and a 02 gate pulse timer 76 associated with the 02 gates comprising a second inverter bridge 78 also shown in detail in FIG. 13.

Each of the ring counters 68 and 74 responds to the output signal from the clock binary 66 to provide three staggered output signals, each occurring over 60 electrical degrees of the fundamental, together with a signal (shown as two separate signals in FIGS. 11G and H and FIGS. 11L and M) in-phase with and at the same frequency as the fundamental. The resulting output signals of the ring counters 68 and 74 are respectively shown in FIGS. 11D through F and I through K. The three signals of FIGS. 11D through F, for example, may be provided by three transistors coupled to operate in shift register fashion so as to comprise a conventional ring counter of three. The signals shown in FIGS. 11G and H, for example, may be provided by a toggle flip-flop coupled to the output of the ring counter so as to change state after each count of three. The output signals of each of the ring counters 68 and 74 are respectively applied to a 01 gate matrix 80 and a 02 gate matrix 82 causing the gate matrices to operate in a manner described hereafter.

The output amplitude of the arrangement of FIG. 10 is regulated in accordance with an external amplitude reference 84 applied to a second error circuit 86 together with voltage feedback from the output. A third input of the error circuit 86 is provided by an overcurrent detector 88 which responds to a current feedback signal from the output. The overcurrent detector 88 is also coupled to the gate pulse timers 70 and 76 to provide substantially instantaneous fault protection in a manner described hereafter.

Figure 13:
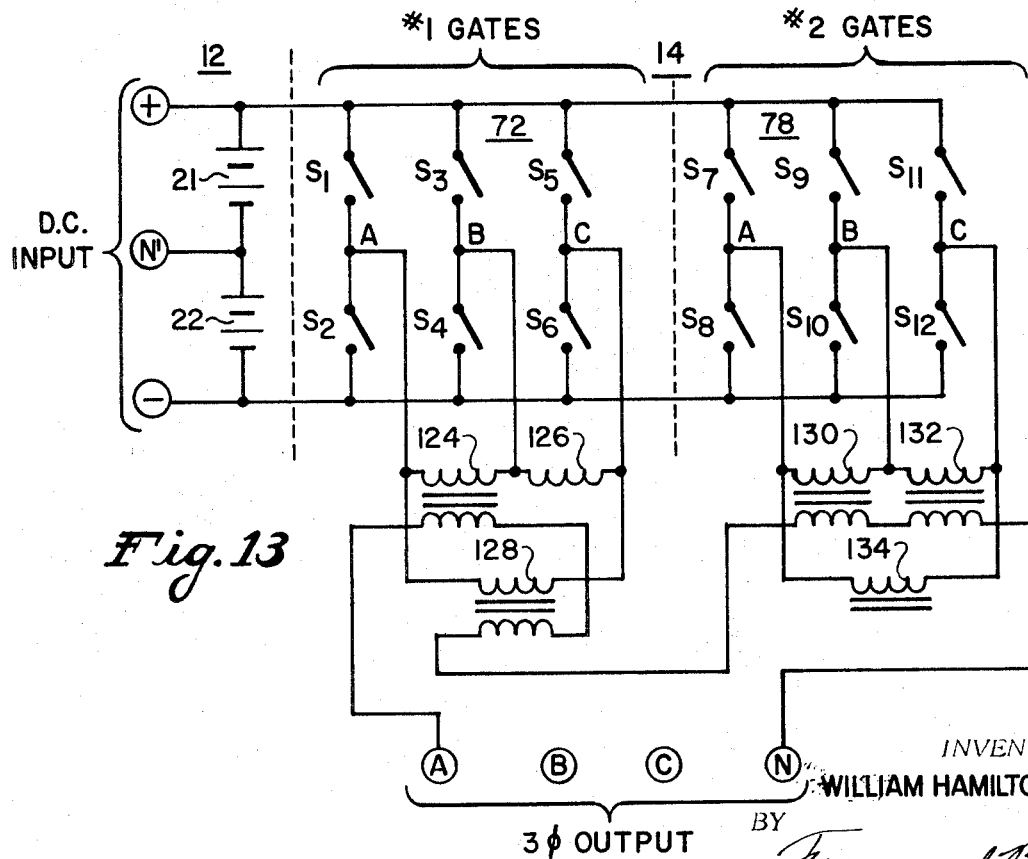
FIG. 13 is a schematic diagram of a portion of the arrangement of FIG. 10 illustrating the inverter bridges or switch networks in conjunction with a typical transformer coupling of one of the output phases thereof.

Current from all six legs of the first and second inverter bridges 72 and 78 shown in FIG. 13 is fed back to the overcurrent detector 88 which comprises a level sensing device such as a flip-flop. The currents are summed at the input of the flip-flop and compared with a selected threshold or reference value. When the current is below the threshold value dictating normal operation of the system, the flip-flop comprising the overcurrent detector 88 remains in a given state to provide to the error circuit 86 a voltage having a value corresponding to the current. If the current at the input of the overcurrent detector 88 rises relatively gradually, the error circuit 86 responds by causing the dwell control 64 to vary the dwell angle to compensate. For most such overload conditions the dwell angle is varied rapidly enough so as to maintain the output current as fed back to the detector 88 below the threshold value. In the event the current at the input of the detector 88 exceeds the threshold value as may typically occur in the presence of a bolted fault condition where the rise in current is too rapid to permit timely compensation by dwell angle variation, the flip-flop comprising the detector 88 responds by changing state to send a signal directly to the gate pulse timers 70 and 76. As will be seen from the discussion to follow this action results in the generation of a second gating pulse immediately following each leading gating pulse provided by the timers so as to substantially instantaneously reduce the dwell angle to the minimum possible value. At the same time a signal from the detector 88 causes the dwell control 64 to independently function so as to establish a minimum dwell angle. As the inverter system output responds to the rapid dwell angle change to reduce the current, the detector 88 continues to be coupled directly to the timers 70 and 76 until such time as the output current is reduced below the threshold value, whereupon the flip-flop comprising the detector 88 returns to the given state to regulate the output via the error circuit 86 and the dwell control 64.

Under conditions of normal operation the external amplitude reference 84 determines regulation of the inverter system output by providing to the error circuit 86 a signal representing a desired output voltage. This signal may typically represent a value such as 120 volts although any appropriate value can, of course, be used. The error circuit 86 which may comprise a differential amplifier compares the reference voltage from the external amplitude reference 84 with the voltage feedback and the current feedback as represented by a voltage from the detector 88. If both input voltages are less than the reference voltage the error circuit 86 reacts by making appropriate increases in the dwell angle via the dwell control 64. In the event either or both input voltages to the error circuit 86 exceed the reference voltage, then the larger of the two input voltages is compared with the reference voltage and the difference therebetween employed to reduce the dwell angle by an appropriate amount.

The dwell control 64 operates in conjunction with the gate pulse timers 70 and 76 to generate a pair of gating pulses during each cycle of the clocking signal from the master clock 62, the time distance between each pair of gating pulses being varied linearly in accordance with the output signal from the error circuit 86.

Figure 12:
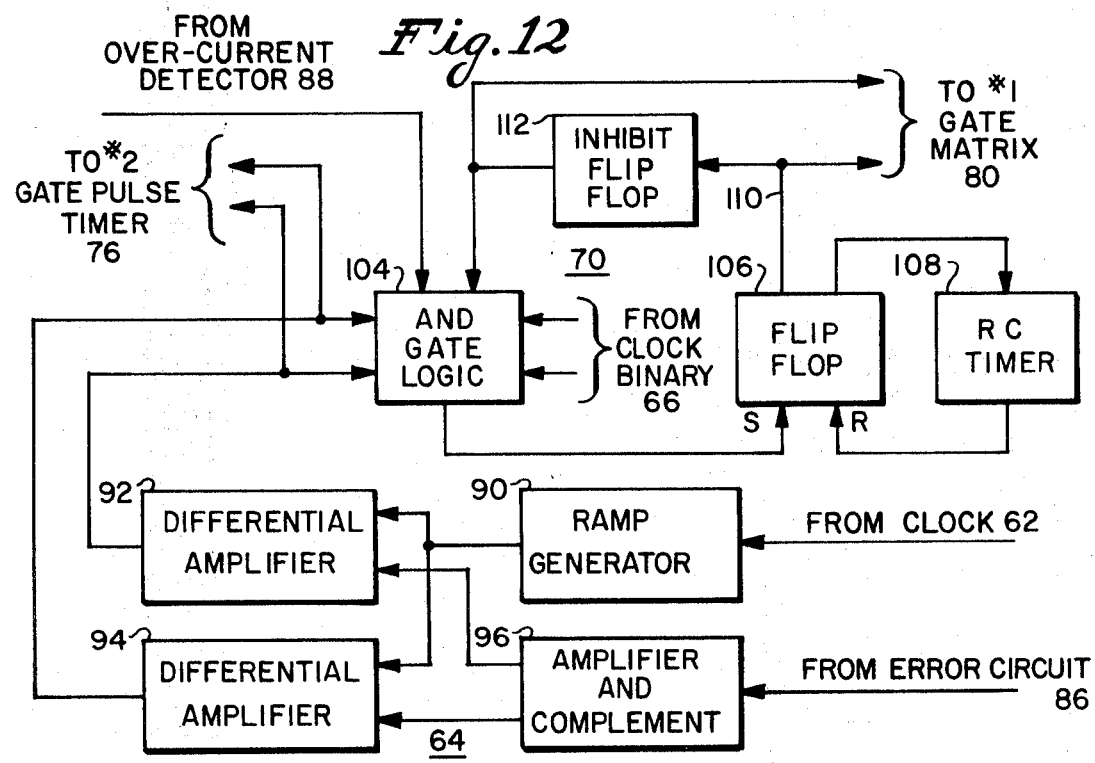
FIG. 12 is a block diagram illustrating the dwell control and one of the gate pulse timers of the FIG. 10 arrangement in greater detail.

The dwell control 64 and the 01 gate pulse timer 70 are shown in detail in FIG. 12. The dwell control circuit 64 includes a ramp generator 90 which responds to the clock 62 to provide to a pair of differential amplifiers 92 and 94 a ramp waveform at a frequency 12 times that of the fundamental as shown in FIG. 11N. The output signal of the error circuit 86 is coupled to an amplifier and complement circuit 96 where amplified representations of the signal itself and its complement are provided to different ones of the differential amplifiers 92 and 94. As seen in FIG. 11N the two outputs of the amplifier and the complement circuit 96 which in this instance are shown as a signal 98 and its complement 100 are referenced relative to a zero axis 102 occurring at a point midway between the top and bottom extremes of the ramp waveform. The signals 98 and 100 move simultaneously and by equal amounts toward or away from the zero axis 102 to respectively decrease or increase the dwell angle in symmetrical fashion and without attendant phase shifting of the output fundamental waveforms. The differential amplifier 92 which provides an output signal shown in FIG. 11O is changed to a first state upon each negative-going excursion of the ramp waveform. The amplifier 92 responds to the complement signal 100 to change to a second state whenever the ramp waveform rises so as to equal the complement signal 100. The differential amplifier 94 functions in similar fashion but in response to the signal 98 so as to change to a second state whenever the ramp waveform at least equals the signal 98 and back to a first state upon each negative-going excursion of the ramp waveform. The signals at the outputs of the differential amplifiers 92 and 94 are passed both to the 01 gate pulse timer 70 and to the 02 gate pulse timer 76, the 01 gate pulse timer 70 being shown in detail in FIG. 12.

The gate pulse timers 70 and 76 operate essentially at a frequency six times that of the fundamental as determined by the clock binary 66 to provide to the gate matrices 80 and 82 information as to when and for how long the gates are to be affected by the different pairs of pulses from the dwell control 64.

The output signals from the differential amplifiers 92 and 94 of the dwell control 64 are applied to AND gate logic 104 together with the output of the clock binary 66 seen in FIG. 11C. A flip-flop 106 responds to each signal at its SET input to change state activating an RC timer 108. The timer 108 provides an appropriate delay between its input and output, which delay is conveniently chosen for purposes of the present example to be 80 microseconds. At the end of this delay the output of the timer 108 resets the flip-flop 106. Accordingly the flip-flop 106 provides an output pulse of 80 microseconds duration at a lead 110 each time a signal appears at the SET input. The SET input of the flip-flop 106 in the present example is designed to respond to each trailing edge of signals at the output of the AND gate logic 104.

The output signals of the differential amplifiers 92 and 94 seen in FIGS. 11O and P essentially have a frequency 12 times that of the fundamental as derived from the input from the clock 62 to the ramp generator 90. The output signal from the clock binary 66 on the other hand has a frequency approximately six times that of the fundamental. Accordingly the AND gate logic 104 shown as being a part of the 01 gate pulse timer 70 operates in conjunction with corresponding AND gate logic in the 02 gate pulse timer 76 to gate alternate cycles of the output signals of the amplifiers 92 and 94 differential the SET inputs of the flip-flops 106 in the two different gate pulse timers. This results in a pair of pulses, each of 80 microsecond duration, at the lead 110 during alternate half cycles of the signals of FIGS. 11O and P as seen in FIGS. 11Q and S, FIG. 11Q representing the output of the flip-flop 106 in the 01 gate pulse timer 70 and FIG. 11S representing the output of the corresponding flip-flop in the 02 gate pulse timer 76. These gating pulses are passed to the respective gate matrices 80 and 82.

An inhibit flip-flop 112 responds to the gating pulses to change state upon the occurrence of each trailing edge as seen in FIGS. 11R and T. The output of the inhibit flip-flop 112 is applied both to the AND gate logic 104 and to the associated 01 gate matrix 80. The inhibit flip-flop 112 performs for the gate matrix 80 a function similar to that performed by the clock binary 66 for the gate pulse timers. More specifically the output signal from the inhibit flip-flop 112 enables the logic circuitry within the gate matrix 80 to determine whether a gate pulse is derived from the differential amplifier 92 or the differential amplifier 94. The inhibit flip-flop 112 also provides to the AND gate logic 104 synchronizing information. More specifically the logic 104 will not allow the signal at the output of the differential amplifier 92 to SET the flip-flop 106 when the flip-flop 112 is in one of its two alternate states.

As previously discussed in connection with FIG. 10 the overcurrent detector 88 bypasses the normal dwell angle variation circuitry in the event of a severe current overload condition by coupling directly to the gate pulse timers 70 and 76. In the event of such an overcurrent condition, the resulting output signal from the detector 88 is applied to the input of the AND gate logic 104 where it is blocked from the SET input of the flip-flop 106 until a first or leading gating pulse is produced by the output of the differential amplifier 92. However, immediately upon the occurrence of this first or leading pulse, the signal from the overcurrent detector 88 is passed by the AND gate logic to again set the flip-flop 106 and thereby generate the second or trailing gating pulse. Referring to FIG. 11Q and by way of example, a pair of gating pulses might normally comprise a first or leading pulse 114 and a second or trailing pulse 116, the time distance therebetween determining the dwell angle. The time distance between the pulses 114 and 116 is varied by action of the error circuit 86 and dwell control 64 under conditions of normal operation to provide constant output amplitude regulation. In the event of a severe fault condition the leading pulse 114 is produced in similar fashion from the differential amplifier 94. However immediately upon the occurrence of the pulse 114 the AND gate logic 104 passes the output signal from the overcurrent detector 88 to generate a second pulse 118 at the minimum possible dwell angle relative to the first pulse 114. The inhibit flip-flop 112 responds to the trailing edge of the second pulse 118 to assume a state which prevents the pulse 116 from occurring. The behavior of the gate pulse timers in the event of a severe overfault condition is described in connection with one pair of gating pulses only for the sake of convenience, and it should be understood that in the event of such condition all of the pairs of pulses in the signals shown in FIGS. 11Q and S are similarly affected.

It will therefore be seen that in the event of a severe overfault condition as determined by the overcurrent detector 88 the normal dwell angle variation circuitry in the form of the error circuit 86 and the dwell control 64 is bypassed by going directly to the gate pulse timers 70 and 76 to produce a substantially instantaneous reduction in the dwell angle to its minimum possible value. The overcurrent detector 88 remains coupled to the gate pulse timers 70 and 76 so as to continue to produce gate pulse pairs spaced the minimum possible distance from one another until such time as the current input to the detector 88 falls below the threshold value, whereupon normal control is restored.

Each of the gate matrices 80 and 82 comprises a plurality of AND gates formed by a diode matrix or other appropriate circuitry and coupled to provide A, B and C outputs through associated gate drivers comprising 01 and 02 gate drivers 120 and 122, respectively, to the A, B and C inverter legs respectively of the first and second inverter bridges 72 and 78 shown in FIG. 13. The AND gates within each of the gate matrices are essentially divided into two groups which are selectively potentially enabled and disabled by the outputs of the respective inhibit flip-flops as seen in FIGS. 11R and T. The AND gates within each matrix are further responsive to the output signals from the associated ring counters as seen in FIGS. 11D through F and I through K. Accordingly, the AND gates within each of the matrices 80 and 82 are selectively enabled to pass to the associated gate drivers selected ones of the gating pulses. Gating pulses which are gated in association with the A inverter leg of the first inverter bridge 72 are illustrated in FIGS. 11U and V. Gating pulses for the B and C inverter legs of the first inverter bridge 72 are likewise shown respectively in FIGS. 11X and Y and FIGS. 11AA and BB. The corresponding gated pulses for the A, B and C inverter legs of the second inverter bridge 78 are respectively shown in FIGS. 11DD and EE, FIGS. 11GG and HH and FIGS. 11JJ and KK. The gate driver associated with the gated signals for each inverter leg includes amplification circuitry for amplifying the gated pulses and a drive flip-flop or other appropriate bistable element which changes state in response to the leading edge of each gated pulse. Thus, as seen in FIG. 11W, the drive flip-flop within the 01 gate drivers 120 associated with the A inverter leg of the first inverter bridge 72 changes state in response to the leading edge of each of the pulses in FIGS. 11U and V. The resulting output of the drive flip-flop is coupled to control the conduction of the switches $S_1$ and $S_2$ in the A inverter leg of the first inverter bridge 72 in alternate fashion. Similarly, the drive flip-flop outputs shown in FIGS. 11Z and CC respectively control the alternate conduction of the switches $S_3$, $S_4$ and $S_5$, $S_6$. The drive flip-flop outputs shown in FIGS. 11FF, II and LL respectively control the conduction of the switches in the A, B and C inverter legs of the second inverter bridge 78 in similar fashion.

As shown in FIG. 13, the A and B terminals of the first inverter bridge 72 are coupled to the opposite ends of a primary winding 124. The B and C terminals are coupled to a primary winding 126, and the A and C terminals are coupled to a primary winding 128. In like fashion, A, B and C terminals of the second inverter bridge 78 are coupled to primary windings 130, 132 and 134. Each of the output phase terminals A, B and C is coupled to the neutral terminal through a serial path including four different secondary windings. As a result, each of the transformer primary windings is coupled to two different secondary windings, there being a total of six primary windings and 12 secondary windings. The transformer innerconnections of the B and C terminals have been eliminated for reasons of clarity with only the A terminal innerconnection being shown in FIG. 13 and described by the remaining waveforms of FIG. 11. Thus, the A terminal is transformer coupled to the primary winding 124 in the direction A to B, to the primary winding 128 in the direction C to A, to the primary winding 130 in the direction A to B, and to the primary winding 132 in the direction B to C. As can be seen in the corresponding waveforms of FIG. 11, the number of turns of the various transformer secondary windings are selectively varied to produce desired values of voltage magnitude.

The signal appearing at the secondary winding associated with the primary winding 124 is illustrated in FIG. 11MM. Similarly, the signals appearing at the secondary windings associated with the primary windings 128, 130 and 132 are respectively shown in FIGS. 11NN, OO and PP. These four different signals are combined so as to appear at the output terminal A in the form of the synthesized sine wave shown in FIG. 11QQ. The B and C output terminals are interconnected with the transformer primaries in a fashion similar to that of the A terminal to provide waveforms identical to that of FIG. 11QQ but phase displaced therefrom and from one another by 120 electrical degrees.

It will be appreciated by those skilled in the art that various advantages arise from an inverter system of the type illustrated generally in FIG. 10 according to the invention. As was seen in connection with FIGS. 11N, O, P, Q and S, the signals 98 and 100 of FIG. 11N vary in symmetrical fashion relative to the zero axis 102 to produce symmetrical variations of the resulting gating pulses of FIGS. 11Q and S relative to the centers of the various cycles of the ramp waveform. This differs significantly from the nonsymmetrical dwell angle variation techniques discussed earlier and the practical result is the absence of any phase shift or increase in harmonic content of the fundamental output waveforms as the dwell angle is varied. Thus as seen in FIG. 10 the output amplitude can be continually regulated during normal operation of the inverter system without interferring in any way with harmonic reduction. The fundamental waveforms remain fixed in time without the need for a closed loop or other control circuitry, and the inverter system can be easily coupled in parallel with existing power systems of fixed phase and frequency. Such existing power systems may be employed to provide the fundamental frequency reference signal input to one or more inverter systems according to the invention, with the practical result that the resulting inverter system output waveforms match in both frequency and phase the corresponding waveforms of the power systems. The amplitude matching of the inverter system output waveforms to those of the existing power systems is then readily accomplished by utilizing the waveform amplitudes of the power systems as the external amplitude reference 84 and constantly regulating the output amplitude of the inverter systems accordingly.

It will further be appreciated by those skilled in the art that numerous advantages arise from the use of digital logic gating circuitry of the type shown and described in connection with FIG. 10. Circuitry of this type is variable in phase dependent upon the input frequency and is not subject to drift and other disadvantages typically present in systems of the type employing master and slave oscillators and fixed phase shifters. Moreover, it will be appreciated by those skilled in the art that the particular gating circuitry used according to the present invention provides for a given harmonic reduction using considerably less circuitry than that required in the prior art. In the particular embodiment of FIG. 10 employing six inverter legs, harmonic reduction up to and including the 11th harmonic is facilitated. On the other hand, many prior art arrangements require 12 inverters and the requisite associated gating circuitry to accomplish harmonic reduction to this degree. The gating circuit arrangement according to the present invention, moreover, readily lends itself to the addition of inverter bridges in the event further harmonic reduction is desired. For example, the conversion of the inverter system shown in FIG. 10 to a three-bridge or nine-leg system requires only the addition of a ring counter, a gate pulse timer, a gate matrix and gate drivers along with an appropriate change in the output frequency of the master clock 62. The individual inverter legs themselves operate at the same power factor. Accordingly, a single inverter leg can be analyzed in terms of worst case and other current conditions with the design criteria which is developed therefrom being applicable to all inverter legs.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a polyphase inverter system having a plurality of switch means coupled to a DC source for providing a plurality of output signals at a fundamental frequency, the output signals being phase displaced relative to one another, having a constant phase displacement relative to a fixed phase reference and having a succession of half cycles with each half cycle comprising a pair of pulses of substantially equal width, the combination comprising:
   gating means coupled to the plurality of switch means for selectively opening and closing the switch means for selected periods of time to produce the pairs of pulses; and
   means associated with the gating means for varying the selected time periods of opening and closing the switch means to produce variations in the widths of the pairs of pulses while at the same time maintaining the phase displacement of the output signals relative to the phase reference constant.

2. The combination defined in claim 1 above, wherein the means for varying the selected time periods shifts the time positions of both the leading and trailing edges of each pulse toward and away from one another by substantially equal amounts.

3. The combination defined in claim 1 above, wherein the gating means includes means for generating a clock signal which is fixed in phase relative to the phase reference and which has a frequency which is a multiple of the fundamental frequency, and means responsive to the clock signal for successively generating pairs of gating pulses, each pair of gating pulses being equidistant in time from the time center of a different cycle of the clock signal, and wherein the means for varying the selected time periods includes means associated with the gating pulse pair generating means for selectively varying the time positions of each pair of gating pulses relative to the time center of the associated clock signal cycle.

4. The combination defined in claim 3 above, wherein the means for varying the selected time periods includes means for generating a signal of ramp waveform which is symmetrical relative to a reference axis, means responsive to a dwell angle command signal for generating a pair of error signals which are of equal value and of opposite sense relative to the reference axis, and means responsive to the signal of ramp waveform and the pair of error signals and associated with the gating pulse pair generating means for controlling the time positions of each generated pair of pulses in accordance with the time positions at which the pair of error signals are equal in value to the signal of ramp waveform.

5. A polyphase inverter system for generating a plurality of output signals of fundamental frequency which are displaced in phase relative to one another and to a phase reference, comprising:
   a DC source;
   a plurality of switching means coupled to the DC source;
   means for generating a clock signal having a frequency at a multiple of the fundamental frequency;
   means responsive to the clock signal for generating a succession of gating signals in synchronism therewith;
   means responsive to the gating signals for operating the switching means to produce a plurality of pulses during each half cycle of the fundamental frequency, said means including counter means responsive to the clock signal for generating a staggered succession of timing signals and gate matrix means responsive to the timing signals and to the gating signals for gating selected ones of the gating signals to the switching means under the control of the timing signals; and means associated with the means for generating a succession of gating signals for selectively varying the time positions of the gating signals to vary the width of each of the plurality of pulses by symmetrically displacing the leading and trailing edges of each pulse relative to the pulse center by substantially equal amounts.

6. A polyphase inverter system in accordance with claim 5, wherein the means for generating a succession of gating signals includes means for generating a feedback signal of the fundamental frequency and of selected phase relative to the phase reference, and further including means for receiving an external reference signal having a frequency determining the fundamental frequency and a phase determining the phase reference, and means responsive to the feedback and reference signals and coupled to the clock signal generating means for adjusting the frequency and phase of the clock signal in accordance with a comparison of the frequency and phase of the feedback and reference signals.

7. A polyphase inverter system in accordance with claim 5, wherein the means for selectively varying the time positions of the gating signals responds to the amplitude of the output signals to cause the width of each of the plurality of pulses to vary as a linear function of the amplitude of the output signals.

8. A polyphase inverter system in accordance with claim 7, further including means for adding to the gating pulses a separate set of gating pulses at selected time positions independently of the means for selectively varying the time positions of the gating pulses whenever the amplitude of the output signals exceeds a threshold value, the separate set of gating pulses effecting a substantially instantaneous change in the widths of the plurality of pulses.

9. An inverter system for generating a three-phase output in synchronism with a reference signal defining a fundamental frequency and a phase reference, the three-phase output comprising three-phase displaced signals of the fundamental frequency having phases which are fixedly related to the phase reference and generally sinusoidal waveforms, comprising the combination of:

a DC source;

a plurality of inverter bridge means coupled to the DC source and each including a plurality of switching means;

transformer means coupled to the plurality of inverter bridge means for providing the three output signals;

first clock means for generating a first clock signal having a frequency which is a multiple of the fundamental frequency;

second clock means responsive to the first clock means for generating a second clock signal having a frequency which is a submultiple of the frequency of the first clock signal;

means for providing an amplitude reference signal;

error circuit means responsive to the amplitude reference signal and to the amplitude of the output signals for generating an error signal in accordance with the difference therebetween;

dwell control means responsive to the first clock signal and to the error signal for generating a pair of signal indications within each cycle of the first clock signal, each pair of signal indications being disposed substantially equidistant from and on opposite sides of the center of the interval defined by the associated cycle of the first clock signal, the distances between the signal indications and the interval center being varied in direct relation to the value of the error signal;

separate gating circuit means coupling each of the inverter bridge means to the second clock means for operating the switching means of the associated inverter bridge means to produce a separate pair of pulses in each half cycle of each of the three output signal phases at the transformer means, each gating circuit means including counter means responsive to the second clock signal to provide successive enabling signals during the different successive cycles of the second clock signal, the counter means including means responsive to the successive enabling signals for generating a feedback signal of the fundamental frequency therefrom, gate pulse timer means responsive to the second clock signal and to the signal indications from the dwell control means for generating a gating pulse in time coincidence with each signal indication, the gate pulse timer means including bistable means changing state in response to each gating pulse to provide an inhibit signal, plural driver means, each coupled to operate a different one of the plurality of switching means in the associated inverter bridge means in response to a gate drive signal, and logic means responsive to the enabling signals, the inhibit signal and the gating pulses for providing the gate drive signals to the associated driver means in accordance with a predetermined logic scheme; and means responsive to the reference signal and to the feedback signal from the countermeans of one of the gating circuit means and coupled to the first clock means for regulating the frequency and phase of the first clock signal in accordance with any differences between the reference and feedback signals.

10. An inverter system in accordance with claim 9, wherein the width of the pulses in each separate pair of pulses in the respective half cycles of the output signal phases is symmetrically varied in direct relation with the time distance between each pair of gating pulses generated by the gate pulse timer means.

11. An inverter system in accordance with claim 9, further including overcurrent detector means responsive to the current of the output signals for temporarily bypassing the error circuit means and the dwell control means whenever the current of the output signals exceeds a predetermined threshold value, the overcurrent detector means including means coupled to the gate pulse timer means of each of the gating circuit means for generating a gating pulse immediately after the occurrence of the first one of each pair of signal indications of the dwell control means when the current of the output signals exceeds the predetermined threshold value to substantially instantaneously reduce the widths of the pairs of pulses in the half cycles of the output signal phases to a minimum value.

12. An inverter system in accordance with claim 9, further including means responsive to the current of the output signals for providing to the error circuit means a signal representing the current of the output signals, and means responsive to the voltage of the output signals for providing to the error circuit means a signal representing the voltage of the output signals, and wherein the error circuit means generates the error signal in accordance with differences between the amplitude reference signal and the larger of the two signals representing the current and voltage of the output signals.

13. An inverter system in accordance with claim 9, wherein the dwell control means includes means responsive to the first clock signal for generating a ramp signal during each cycle of the first clock signal, the ramp signal being symmetrically disposed relative to a zero reference axis, means responsive to the error signal for providing true and complementary signals equidistant from and on opposite sides of the zero reference axis, means responsive to the ramp signal and to the true signal for generating the first one of each pair of signal indications whenever the ramp signal equals the true signal, and means responsive to the ramp signal and to the complementary signal for providing the second one of each pair of signal indications whenever the ramp signal equals the complementary signal.

14. An inverter system in accordance with claim 9, wherein each gate pulse timer includes logic circuit means responsive to the second clock signal and to the pairs of signal indications from the dwell control means for providing alternate ones of the pairs of signal indications to an output thereof, second bistable means responsive to the output of the logic circuit means for assuming a first state each time a signal indication appears at the output of the logic circuit means, timing means responsive to the assumption of the first state by the second bistable means for changing the second bistable means to a second state after a selected period of time to provide a gating pulse at the output of the second bistable means in response to each signal indication at the output of the logic circuit means, the first-mentioned bistable means being coupled to the output of the second bistable means and operative to change state in response to each gating pulse at the output of the second bistable means to provide the inhibit signal.

UNITED STATES PATENT OFFICE
CERTIFICATE OF CORRECTION

Patent No. 3,609,507          Dated September 28, 1971

Inventor(s) William Hamilton Beck

It is certified that error appears in the above-identified patent and that said Letters Patent are hereby corrected as shown below:

In the Abstract, line 3, after "amplitude regulation." insert --The pulse width modulation defined in terms of a dwell angle occurs in response to differences between output amplitude and a reference. Pairs of output pulses comprising half cycles of the output phases are symmetrically varied in width so as to avoid phase shift while at the same time providing higher order harmonic reduction or cancellation and the desired output amplitude. When a relatively severe fault condition occurs, normal dwell angle variation is bypassed in favor of circuitry which substantially immediately and independently generates internal gating pulses to effect the desired correction. The circuitry of the power conditioning system is essentially digital in character and includes timing and counting circuitry and matrices which respond to a common clock.--. Column 11, line 19, "01" should read --#1--; line 20, "01" should read --#1-- (two occurrences); line 22, "02" should read --#2-- (two occurrences); line 23, "02" should read --#2--; line 40, "01" should read --#1--; line 40, "02" should read --#2--. Column 12, line 37, "01" should read --#1--; line 68, "01" should read --#1--; line 68, "02" should read --#2--; line 69, "01" should read --#1--. Column 13, line 21, "01" should read --#1--; line 23, "02" should read --#2--; line 24, "differential" should read --to--; line 30, "01" should read --#1--; line 31, "02" should read --#2--; line 38, "01" should read --#1--. Column

UNITED STATES PATENT OFFICE
CERTIFICATE OF CORRECTION

Patent No. 3,609,507  Dated September 28, 1971

Inventor(s) William Hamilton Beck

It is certified that error appears in the above-identified patent and that said Letters Patent are hereby corrected as shown below:

Page -2-

14, line 24, "01" should read --#1--; line 24, "02" should read --#2--; line 49, "01" should read --#1--.

Signed and sealed this 19th day of September 1972.

(SEAL)
Attest:

EDWARD M. FLETCHER, JR.
Attesting Officer

ROBERT GOTTSCHALK
Commissioner of Patents